Dec. 22, 1925.  
F. M. MOORE  
1,566,909  
COMBINATION COOKING AND HEATING STOVE  
Filed Feb. 13, 1925 2 Sheets-Sheet 1
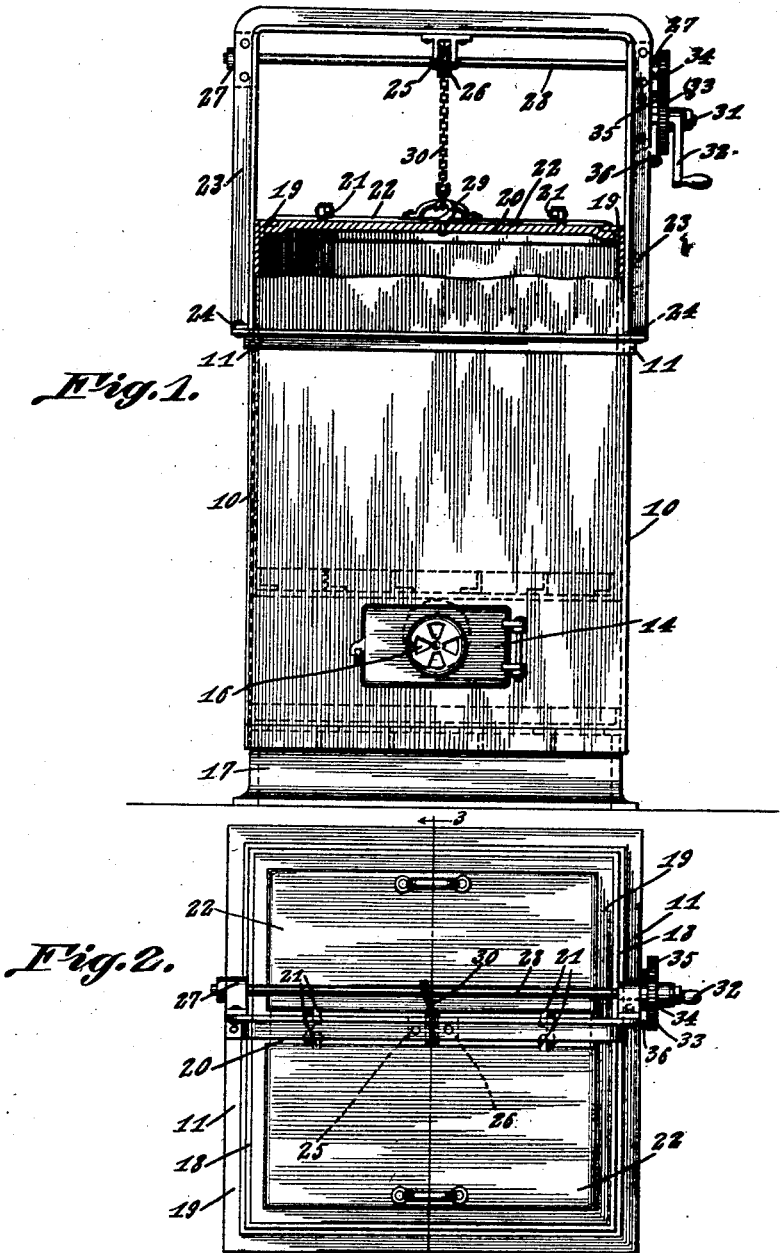
Francis M. Moore, INVENTOR.
BY
Geo. P. Kimmel, ATTORNEY.

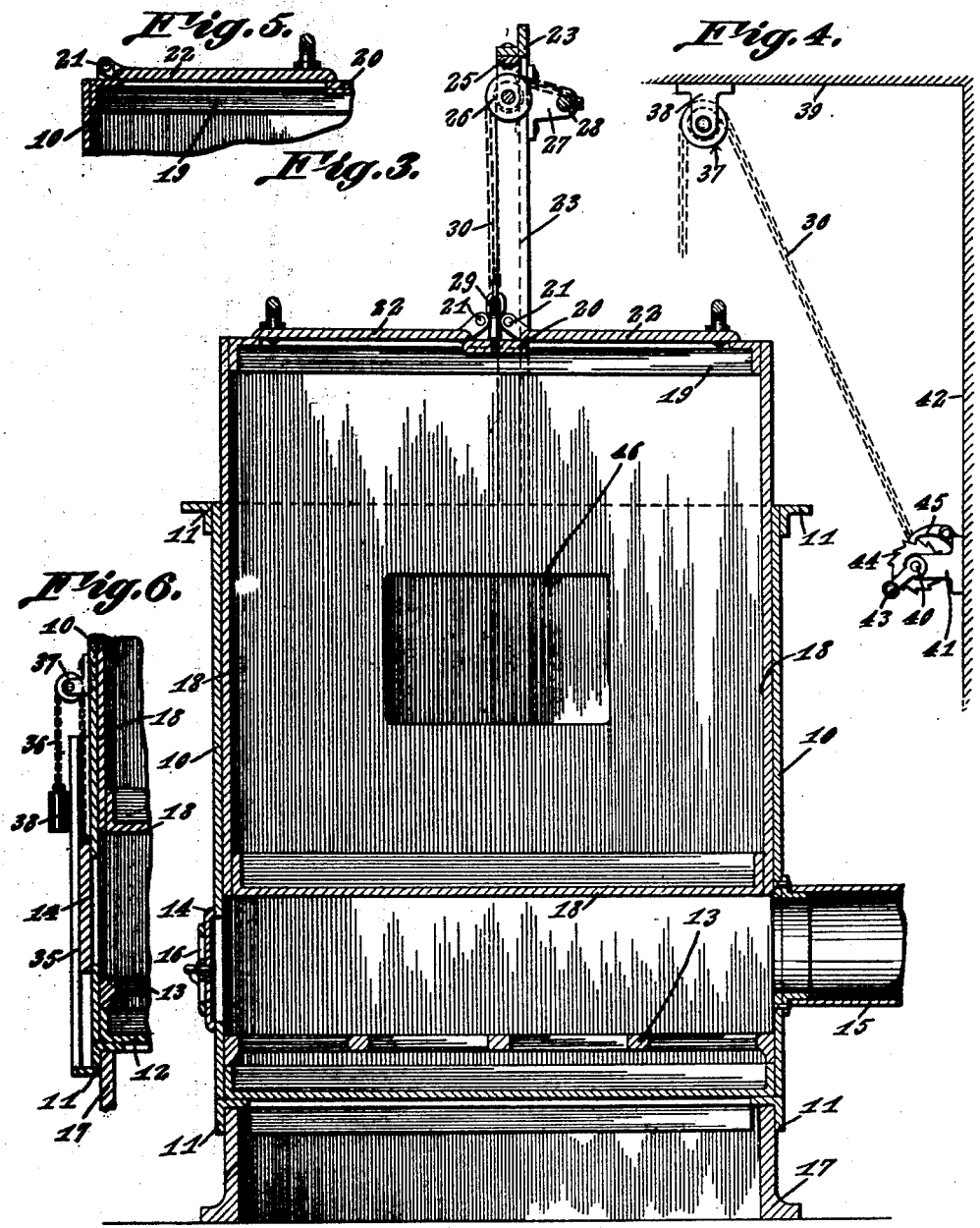

Patented Dec. 22, 1925.

1,566,909

UNITED STATES PATENT OFFICE.

FRANCIS M. MOORE, OF HANNIBAL, MISSOURI.

COMBINATION COOKING AND HEATING STOVE.

Application filed February 13, 1925. Serial No. 8,932.

*To all whom it may concern:*

Be it known that I, FRANCIS M. MOORE, a citizen of the United States, residing at Hannibal, in the county of Marion and State of Missouri, have invented certain new and useful Improvements in Combination Cooking and Heating Stoves, of which the following is a specification.

This invention relates to stoves, and has for one of its objects to provide an apparatus of this character including an outer shell or casing having a fire chamber in the lower part, and an oven in the chamber and adapted to be moved toward and away from the fire in the chamber.

With these and other objects in view the invention consists in certain novel features of construction as hereinafter shown and described and then specifically pointed out in the claim, and in the drawings illustrative of the preferred embodiment of the invention—

Fig. 1 is a front elevation, partly in section, of the improved apparatus, and—

Fig. 2 is a plan view of the same.

Fig. 3 is a vertical sectional elevation.

Fig. 4 is a detail illustrating a modification in the manner of adjusting the oven portion of the device.

Fig. 5 is a sectional detail illustrating a modification of the mounting of the closures to the oven.

Fig. 6 is a sectional detail illustrating a modification in the arrangement of the combined fuel and draft door.

The improved apparatus includes an outer shell or casing of any desired size, or proportion, and any suitable material or combination of materials.

For the purpose of illustration the outer shell is shown formed with sheet metal walls 10 reinforced by L metal members 11.

The bottom 12 of the outer shell constitutes the support for the fuel when wood is employed, or a grate 13 may be employed when coal or the like is to be employed.

A feed door 14 is swingingly attached to the shell near the bottom at one side and a smoke flue 15 leads therefrom as shown. The feed door 14 is provided with an air inlet member 16, as shown.

The shell 10 will preferably be mounted on a suitable base 17, as shown.

The oven portion of the improved apparatus is formed of a shell or casing of any suitable material, but for the purpose of illustration is shown formed with sheet metal walls 18 open at the top and reinforced by L metal members 19.

Extending across the open top of the oven is a stay member 20, and hingedly connected at 21 to the stay member are closure members 22.

The oven member is designed to telescopically engage in the outer shell, as shown, and is movable within the outer shell to control the distance of the bottom of the oven relatively to the fire in the fire chamber, and thus correspondingly control the degree of heat imparted to the oven and its contents.

Means are provided for controlling the position of the oven within the shell and comprising an inverted U-shaped frame 23 attached at 24 to the shell, and provided with a depending hanger 25 in which a chain pulley 26 is supported. The frame 23 is provided with brackets 27 in which a winding shaft 28 is mounted. Attached at 29 to the stay bar 20 is a chain or cable 30, which passes thence over the pulley 26 and is attached to the shaft 28 on which it is wound as the latter is rotated, to draw the oven device upwardly, the downward movement of the oven being effected by gravity.

Attached to the frame 23 is a stub shaft 31 carrying a crank 32, and a gear 33, the latter engaging a pinion 34 on the shaft 28. By this arrangement it will be obvious that the shaft 28 will be rotated by actuating the crank 32, and at increased speed to wind the chain on the shaft as a drum. A stop ratchet 35 and pawl 36 are provided, to hold the oven device at any desired elevation.

Under certain circumstances the oven elevating means may be coupled to the ceiling of the room in which the stove is located, as shown in Fig. 4, and the operating chain or cable 30 carried over a chain wheel 37 mounted in a bracket 38 attached to the ceiling indicated at 39, and conducted thence to a winding shaft 40 mounted in a bracket 41 attached to one of the side walls 42 of the room, the shaft having a turning crank 43, a stop ratchet 44 and pawl 45 associated therewith as shown in Fig. 4.

The oven will also be preferably provided with a lateral opening in one of its sides as indicated at 46, to enable the contents of the oven to be inserted or removed therethrough instead of through the top, or to inspect the contents of the oven during the cooking operations.

By this simple arrangement, the oven may be easily adjusted to subject the contents to any desired degree of heat, and also to insure the heat being imparted in a constant ascending direction, and coming in contact, to the greatest degree, with the bottom of the oven where it is most needed, and where it is most advantageously applied.

The oven portion of the device also serves as an efficient heating drum, and the heat radiated therefrom may be controlled by changing the position of the oven or drum relative to the shell and fire chamber.

The preferred embodiment of the invention is disclosed in the drawings and set forth in the specification, but it will be understood that modifications within the scope of the claimed invention may be made in the construction without departing from the principle of the invention or sacrificing any of its advantages.

The closures 22 may be hingedly coupled to the outer sides of the oven instead of to the stay member 20, as represented in Fig. 5, and the fuel door 14 may be arranged to slide in guideways 35 as represented in Fig. 6. When thus arranged, the fuel door is controlled by a chain 36 passing over a guide pulley 37, and terminating in a balance weight 38. The guide members 35 extend below and above the fuel doorway opening, so that the fuel door 14 may be disposed to admit air below the door to feed the fire, or to admit air above the door to check the fire, as may be required.

Having thus described the invention, what is claimed is:

A combination cooking and heating stove, comprising an outer shell open at its upper end and formed with a lower fire chamber, an inner shell forming an oven, inserted through the open upper end of the outer shell, and snugly telescoped in the latter for sliding movement, the top of the oven being provided with openings, hinged lids closing the openings and adapted to swing toward and away from each other, and means for raising and lowering the oven, one side of the oven being formed with an opening and closed on the descending movement of said oven within the outer shell.

In testimony whereof, I affix my signature hereto.

FRANCIS M. MOORE.